(12) United States Patent
Jin et al.

(10) Patent No.: US 11,842,490 B2
(45) Date of Patent: Dec. 12, 2023

(54) FUNDUS IMAGE QUALITY EVALUATION METHOD AND DEVICE BASED ON MULTI-SOURCE AND MULTI-SCALE FEATURE FUSION

(71) Applicant: Zhejiang University, Hangzhou (CN)

(72) Inventors: Kai Jin, Hangzhou (CN); Juan Ye, Hangzhou (CN); Zhiyuan Gao, Hangzhou (CN); Xiaoyu Ma, Hangzhou (CN); Yaqi Wang, Hangzhou (CN); Yunxiang Li, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 18/191,088

(22) Filed: Mar. 28, 2023

(65) Prior Publication Data

US 2023/0274427 A1    Aug. 31, 2023

Related U.S. Application Data

(63) Continuation of application No. PCT/CN2022/130452, filed on Nov. 8, 2022.

(30) Foreign Application Priority Data

Feb. 21, 2022   (CN) .......................... 202210155190.9

(51) Int. Cl.
*G06T 7/00* (2017.01)
*G06V 10/80* (2022.01)
(Continued)

(52) U.S. Cl.
CPC .............. *G06T 7/0012* (2013.01); *G06T 3/40* (2013.01); *G06T 7/11* (2017.01); *G06V 10/44* (2022.01);
(Continued)

(58) Field of Classification Search
CPC . G06T 7/0012; G06T 3/40; G06T 7/11; G06T 2207/10024; G06T 2207/20081;
(Continued)

(56) References Cited

U.S. PATENT DOCUMENTS

| | | | |
|---|---|---|---|
| 2017/0270653 A1* | 9/2017 | Garnavi | .................... G06N 5/01 |
| 2020/0202529 A1* | 6/2020 | Hart | ...................... A61B 3/1241 |
| 2021/0390696 A1* | 12/2021 | Iwase | ...................... G06T 5/009 |

FOREIGN PATENT DOCUMENTS

| | | | |
|---|---|---|---|
| CN | 108095683 A | | 6/2018 |
| CN | 110837803 A | | 2/2020 |

(Continued)

OTHER PUBLICATIONS

Raj et al. "Fundus Image Quality Assessment: Survey, Challenges, and Future Scope." IET Image Processing, vol. 13, iss.8, https://doi.org/10.1049/iet-ipr.2018.6212, May 2, 2019, pp. 1211-1224 (Year: 2019).*

(Continued)

*Primary Examiner* — Jon Chang
(74) *Attorney, Agent, or Firm* — Rachel K. Pilloff; Sean A. Passino; Pilloff Passino & Cosenza LLP

(57) ABSTRACT

Disclosed is a fundus image quality evaluation method based on multi-source and multi-scale feature fusion, comprising following steps: S1, acquiring multi-source fundus images, labeling the multi-source fundus images with four evaluation dimensions of brightness, blur, contrast and overall image quality, and forming training samples with the fundus image and labeling labels; S2, constructing a fundus image quality evaluation network including a feature extraction module, a fusion module, an attention module and an evaluation module; S3, training the fundus image quality evaluation network by using training samples to obtain a fundus image quality evaluation model; and S4: inputting fundus images to be measured into the fundus image quality (Continued)

evaluation model, and outputting quality evaluation results through calculation. Also provided is a fundus image quality evaluation device based on above method.

8 Claims, 4 Drawing Sheets

(51) Int. Cl.
*G06V 20/70* (2022.01)
*G06V 10/44* (2022.01)
*G06V 10/764* (2022.01)
*G06T 3/40* (2006.01)
*G06V 10/774* (2022.01)
*G06T 7/11* (2017.01)

(52) U.S. Cl.
CPC .......... *G06V 10/764* (2022.01); *G06V 10/774* (2022.01); *G06V 10/806* (2022.01); *G06V 20/70* (2022.01); *G06T 2207/10024* (2013.01); *G06T 2207/20081* (2013.01); *G06T 2207/20132* (2013.01); *G06T 2207/30041* (2013.01); *G06T 2207/30168* (2013.01); *G06V 2201/03* (2022.01)

(58) Field of Classification Search
CPC . G06T 2207/20132; G06T 2207/30041; G06T 2207/30168; G06V 10/44; G06V 10/764; G06V 10/774; G06V 10/806; G06V 20/70; G06V 2201/03; G06F 18/253; G06F 18/241; G06N 3/08; G06N 3/045
See application file for complete search history.

(56) References Cited

FOREIGN PATENT DOCUMENTS

| CN | 111127425 | A | | 5/2020 | |
|---|---|---|---|---|---|
| CN | 111667490 | A | | 9/2020 | |
| CN | 111768362 | A | | 10/2020 | |
| CN | 112434745 | A | | 3/2021 | |
| CN | 112634238 | A | * | 4/2021 | |
| CN | 112766376 | A | | 5/2021 | |
| CN | 114612389 | A | | 6/2022 | |
| WO | WO-2019082202 | A1 | * | 5/2019 | .......... G06T 7/0012 |
| WO | WO-2021114818 | A1 | * | 6/2021 | |

OTHER PUBLICATIONS

Raj et al. "Multivariate Regression-Based Convolutional Neural Network Model for Fundus Image Quality Assessment." IEEE Access, vol. 8, Mar. 23, 2020, 12 pages (Year: 2020).*
English Translation for CN112634238A (Year: 2021).*
English Translation for WO2021114818A1 (Year: 2021).*
Wang, et al."Human Visual System-Based Fundus Image Quality Assessment of Portable Fundus Camera Photographs" IEEE Transactions On Medical Imaging, vol. 35, No. 4, Apr. 2016.
Gao et al., "Multi-Scale PIIFD for Registration of Multi-Source Remote Sensing Images" Journal of Beijing Institute of Technology, 2021, vol. 30, No. 2.

* cited by examiner

FUNDUS IMAGE QUALITY EVALUATION METHOD AND DEVICE BASED ON MULTI-SOURCE AND MULTI-SCALE FEATURE FUSION

CROSS-REFERENCE TO RELATED APPLICATIONS

This application claims priority to Chinese Patent Application No. 202210155190.9, filed on Feb. 21, 2022, the contents of which are hereby incorporated by reference.

TECHNICAL FIELD

The present application belongs to the technical field of medical image processing, and particularly relates to a fundus image quality evaluation method and device based on multi-source and multi-scale feature fusion.

BACKGROUND

Fundus photography is the most important imaging method to diagnose diabetic retinopathy, glaucoma, age-related macular degeneration and other eye diseases. With the development of artificial intelligence, automatic disease screening through fundus images has become a hot topic in current research. Therefore, the quality of fundus image is of great significance to the performance of diagnosis model, and image quality evaluation is indispensable for automatic diagnosis system. Manual quality evaluation by experts, the most reliable method, however, is costly and time-consuming and makes the automatic diagnosis system inefficient and meaningless.

Due to complex clinical scenes, there are many fundus imaging methods in clinical practice, such as color fundus photography (CFP), portable digital fundus photography and ultra-wide field fundus photography (UWF). Color fundus photography is the main imaging method, and many artificial intelligence models are based on color fundus photography. However, the color fundus photography requires desktop imaging equipment, which limits application of color fundus photography in primary health care. The portable digital fundus photography equipment may be handheld, so the portable digital fundus photography is more suitable for low-level health service centers, especially in rural areas of developing countries. However, images of camcorders may lack details of lesions, and artifacts usually appear. Compared with standard fundus photography, the ultra-wide field fundus photography as a new technology can capture the visual field of up to 200 degrees as for its single image, and the ultra-widefield fundus photography is fast, efficient, easy to use and non-mydriatic. The ultra-widefield fundus photography also has potential prognostic significance, because it can detect peripheral lesions. However, ultra-widefield fundus photography machine is expensive, and its cost-effectiveness is still an important consideration. Considering the advantages and disadvantages of the above methods, as a comprehensive fundus image quality evaluation system, it should be able to process the above three basic images to meet various clinical needs.

Previous studies have proposed several methods to automatically evaluate the quality of fundus images, and the methods can be divided into global similarity-based methods and local structure subdivision-based method but there are still some problems to be solved. First of all, the generality of each quality evaluation method is uncertain. Many studies train models on single-center data sets, ignoring types of imaging devices, eye conditions and imaging environment. Secondly, the current image quality evaluation methods focus on one of local or global information, but both local and global information are equally important to doctors. Thirdly, due to the "black box" feature of deep learning network, the recent algorithms for evaluating image quality by deep learning are not interpretable enough, while the commonly used interpretation methods, such as heat map, may not be convincing enough.

SUMMARY

In order to solve the above problems, the present application proposes a fundus image quality evaluation method based on multi-source and multi-scale fusion. This method uses a human visual system, adopts a plurality of representative data sources, and simultaneously combines spatial weighted and self-weighted fundus image quality evaluation networks to comprehensively and objectively evaluate fundus images.

A fundus image quality evaluation method based on multi-source and multi-scale feature fusion includes:

S1: acquiring multi-source fundus images, and labeling the multi-source fundus images with four evaluation dimensions of brightness, blur, contrast and overall image quality to obtain labels, and forming training samples with fundus images and the labels;

S2: constructing a fundus image quality evaluation network including the fundus image quality evaluation network includes a feature extraction module, a fusion module, an attention module and an evaluation module, where the feature extraction module includes multi-scale feature extractors for extracting multi-scale image features of fundus images, the fusion module is used for fusing the multi-scale image features to obtain fused features, the attention module is used for performing attention operation on input fused features, and inputting the dot product of attention operation results and input fused features to the evaluation module, and the evaluation module is used for predicting and performing calculation on the dot product to output quality evaluation results, and the quality evaluation results include brightness evaluation results, blur evaluation results, contrast evaluation results and overall image quality evaluation results;

S3: training the fundus image quality evaluation network by using the training samples, and obtaining a fundus image quality evaluation model after training; and S4: inputting fundus images to be measured into the fundus image quality evaluation model, and outputting the quality evaluation results through calculation.

Specifically, the multi-source fundus images include common color fundus photographs taken by a common camera, fundus photographs taken by a portable fundus camera and ultra-widefield fundus photographs taken by an ultra-widefield camera, and the multi-source fundus images are from medical treatment data of healthy subjects, diabetic retinopathy patients and glaucoma patients.

Optionally, before the fundus images are input into the fundus image quality evaluation network, the fundus images are preprocessed, including cropping, scaling and obtaining a mask of eyes, and preprocessed fundus images are input into the fundus image quality evaluation network, so as to improve an effect of multi-scale feature extractors on feature extraction of the fundus images.

Optionally, the feature extraction module includes feature extractors with four scales, and scales of correspondingly input fundus images are ¼, ⅛, 1/16, and 1/32 of an original image resolution, respectively. Each feature extractor performs convolution operation on the input fundus images to obtain image features, and dimensions and sizes of the image features output by the feature extractors are the same, so as to facilitate subsequent image stitching and fusion.

Optionally, the image features output by each feature extractor are spliced and then input to the fusion module. The fusion module performs a convolution operation on spliced image features by adopting convolution layers, and the fused features are obtained.

Optionally, the evaluation module is a Multi-Layer Perceptron (MLP) classifier, and the MLP classifier is adopted to predict and perform calculation on the input fused features to output quality evaluation results;

Optionally, during training, for each evaluation dimension, a cross entropy of labeling labels and evaluation results is taken as a loss function of single evaluation dimension, and parameters of the fundus image quality evaluation network are updated by comprehensively considering loss functions of four evaluation dimensions.

Specifically, during training, Adaptive Moment Estimation (Adam) is selected as an optimizer, and an initial learning rate is set to be 0.001, and a weight decay coefficient is 0.0005.

The present application also provides a fundus image quality evaluation device, including:

a computer memory, a computer processor and a computer program stored in the computer memory and executable on the computer processor, where the above-mentioned fundus image quality evaluation model is adopted in the computer memory. When the computer processor executes the computer program, following steps are implemented: fundus images to be detected are input into the fundus image quality evaluation model, and evaluation results of fundus image quality are output through calculation.

Compared with the prior art, the beneficial effects of the present application are:

Firstly, the present application proposes the image quality evaluation method based on multi-source and multi-scale feature fusion and achieves robustness of image quality evaluation considering multi-type fundus photography databases, different imaging devices and imaging environments.

Secondly, based on the human visual system, the application outputs brightness, blur, contrast and overall image quality as evaluation indexes and imitates evaluation ideas of doctors while fundus images are recognized, so that the evaluation results are more in line with actual situations.

DETAILED DESCRIPTION OF THE EMBODIMENTS

In order to make the objectives, technical scheme and advantages of the present application clearer, the present application will be further explained in detail below with reference to the drawings and examples. It should be understood that the specific embodiments described here are only used to explain the application, and do not limit the scope of protection of the application.

Figure 1:
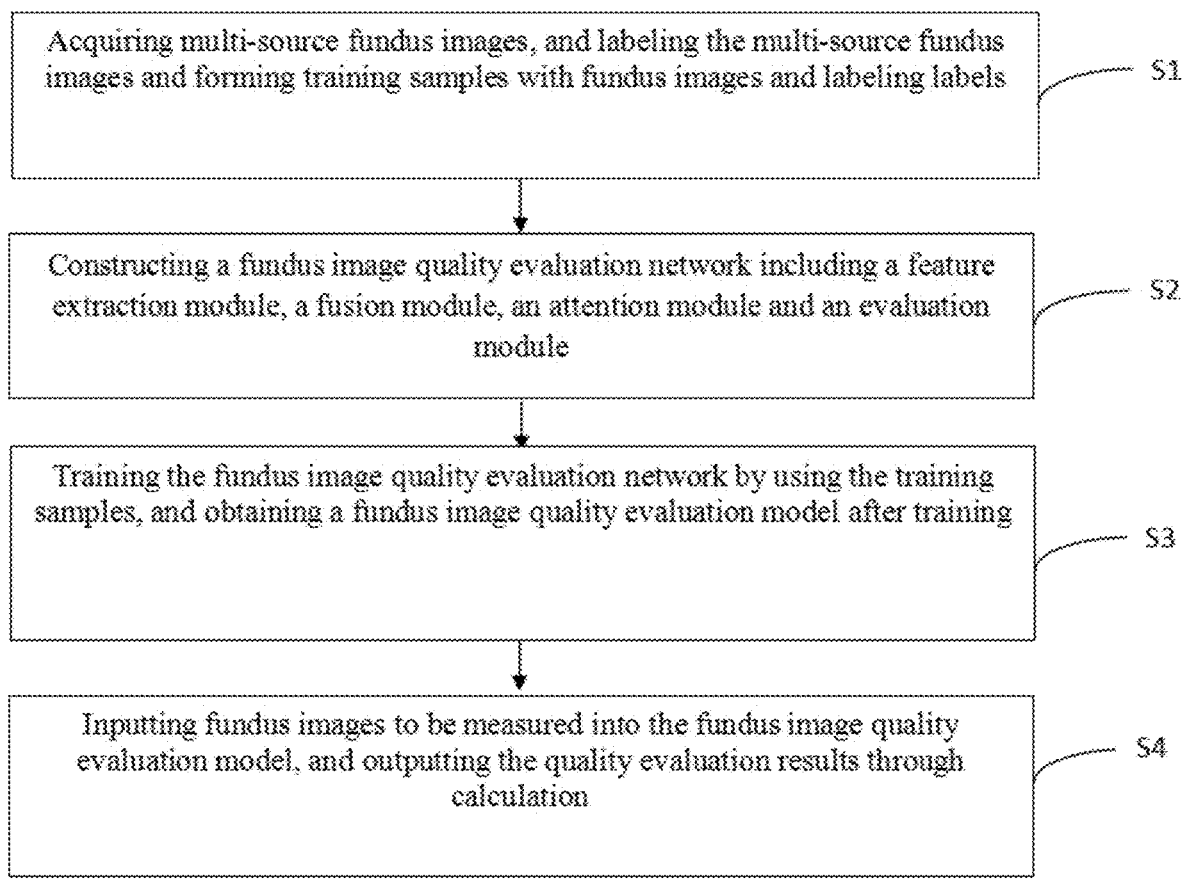
FIG. 1 is a flowchart of a fundus image quality evaluation method provided by the present application.

In an embodiment, as shown in FIG. 1, a fundus image quality evaluation method based on multi-source and multi-scale feature fusion is provided, including following steps:

S1: acquiring multi-source fundus images, and labeling the multi-source fundus images with four evaluation dimensions of brightness, blur, contrast and overall image quality to obtain labels, and forming training samples with the fundus images and the labels, where the multi-source fundus images include common color fundus photographs taken by a common camera, fundus photographs taken by a portable fundus camera, and ultra-widefield fundus photographs taken by a ultra-widefield camera.

Common color fundus photographs are composed of three parts: one part is from the Department of Ophthalmology, Affiliated Hospital of Medical College of Zhejiang University, including 187 color fundus photographs (CFP) of diabetic retinopathy (DR) patients, 52 fundus photographs of glaucoma (GLU) patients and 26 normal (NORMAL) subjects in Picture Archiving and Communication Systems (PACS) of the hospital. These photographs are all taken by TRC-NW8 desktop fundus camera, with a field of view of 50 degrees and a resolution of 1924*1556.

Another part is from the Department of Ophthalmology, the Second Affiliated Hospital of Xi'an Jiaotong University. This part contains 235 color fundus photographs (CFP) of diabetic retinopathy (DR) patients. These photographs are taken by Kowa Nonmyd fundus camera, with a visual field of 45 degrees and a resolution of 1924*1556.

The last part comes from public databases, including 216 pictures from DRIMD database with a visual field of 60 degrees and a resolution of 570*760, and 40 pictures from DRIVE database with a visual field of 45 degrees and a resolution of 565*584.

The fundus photographs taken by the portable camera come from the Eye Center of the Second Affiliated Hospital of Medical College of Zhejiang University. Here, the fundus photographs include 302 fundus images (LOCAL 1&COCAL2) of normal subjects taken by a DEC200 portable camera, with a visual field of 60 degrees and a resolution of 2560*1960.

The ultra-widefield fundus photographs are from the Eye Center of the Second Affiliated Hospital of Medical College of Zhejiang University. The ultra-wide fundus photographs include 500 ultra-widefield fundus (UWF) images of diabetic retinopathy (DR) patients taken by Optos ultra-widefield camera, with a field of view of 200 degrees and a resolution of 1924*1556.

Figure 2:
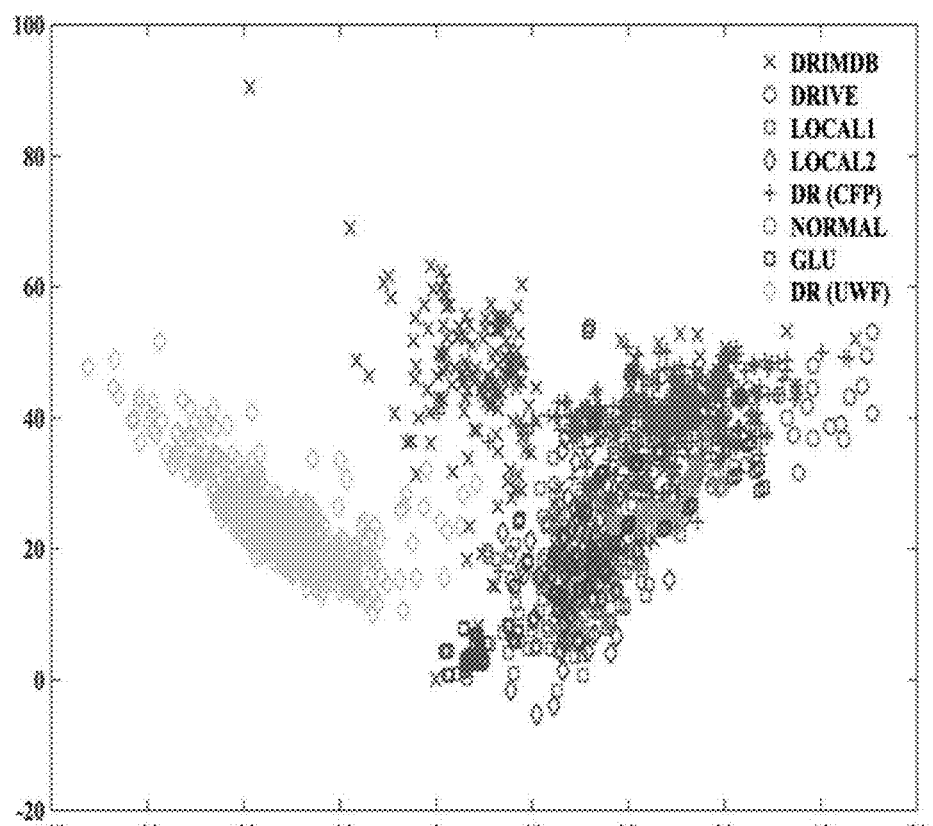
FIG. 2 is a schematic diagram of spatial scatter distribution of multi-source heterogeneous fundus photography database.

As shown in FIG. 2, all the above photographs are transferred from red, green, blue (RGB) color space to CIELAB (Lab) color space, where channel a represents an intensity of red and green opponent colors, the higher a positive value, the redder it is, the higher a negative value, the greener it is, and channel b represents an intensity of yellow and blue opponent colors, the higher a positive value, the yellower it is, and the higher a negative value, the bluer it is. As can be seen from FIG. 2, there is significant difference between the above photographs.

Pre-processing the fundus images in the training samples includes: 1. cropping the left and right blank areas of images to be estimated to make width and height of the images equal; 2. zooming cropped images to a resolution of 512×

512; 3. getting a mask (i.e., channel alpha, marked as mask) of eyes by brightness information and edge information.

Figure 3:
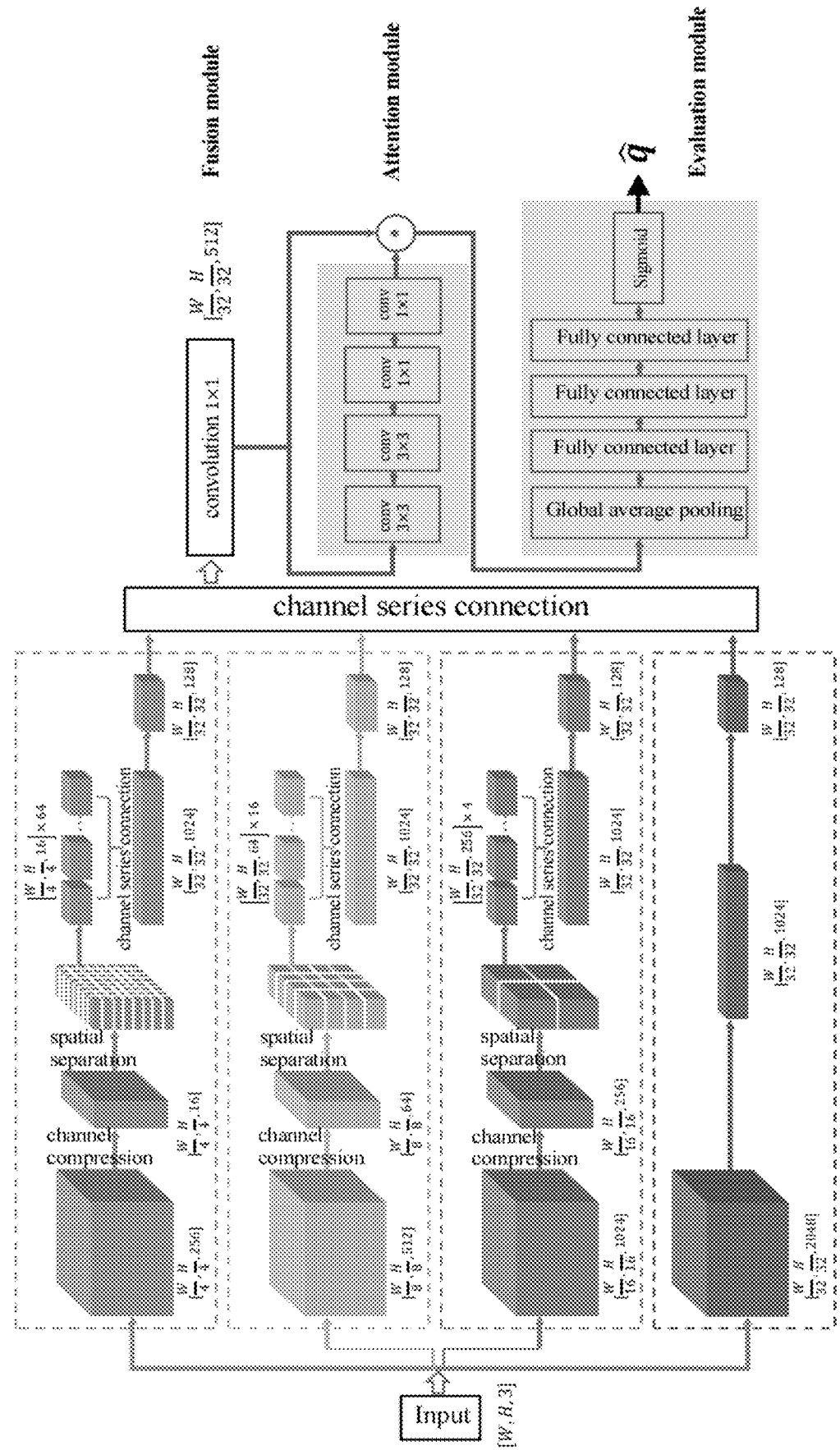
FIG. 3 is a schematic diagram of an overall structure of deep neural networks (DNN) based on multi-source and multi-scale feature fusion for fundus image quality evaluation provided by the present application.

S2: constructing a fundus image quality evaluation network as shown in FIG. 3, including a feature extraction module, a fusion module, an attention module and an evaluation module.

The feature extraction module includes feature extractors with four scales for extracting multi-scale image features of the fundus images. Scales of correspondingly input fundus images are ¼, ⅛, 1/16, and 1/32 of an original image resolution, respectively. Each feature extractor performs a convolution operation on the input fundus images to obtain image features with the same dimensions and sizes and the image features output by each feature extractor are spliced and then input to the fusion module.

The fusion module is used for fusing the multi-scale image features to obtain fused features, the attention module is used for performing attention operation on input fused features, and inputting the dot product of attention operation results and input fused features to the evaluation module, and the evaluation module is used for predicting and performing calculation on the dot product to output quality evaluation results, and the quality evaluation results include brightness evaluation results, blur evaluation results, contrast evaluation results and overall image quality evaluation results.

The fusion module is used to fuse multi-scale image features to obtain fused features. Convolution layers are used to convolve spliced image features to obtain the fused features with spatial consistency and containing multi-scale information, and the fused features are input to the attention module.

The attention module is used to perform attention operation on the input fused features, and multiply attention operation results with input fused feature points and then input results to the evaluation module.

The evaluation module adopts Multi-Layer Perceptron (MLP) classifier for predicting and performing calculation on the input fused features by the attention module to output quality evaluation results and the quality evaluation results include brightness evaluation results, blur evaluation results, contrast evaluation results and overall image quality evaluation results.

Figure 4:
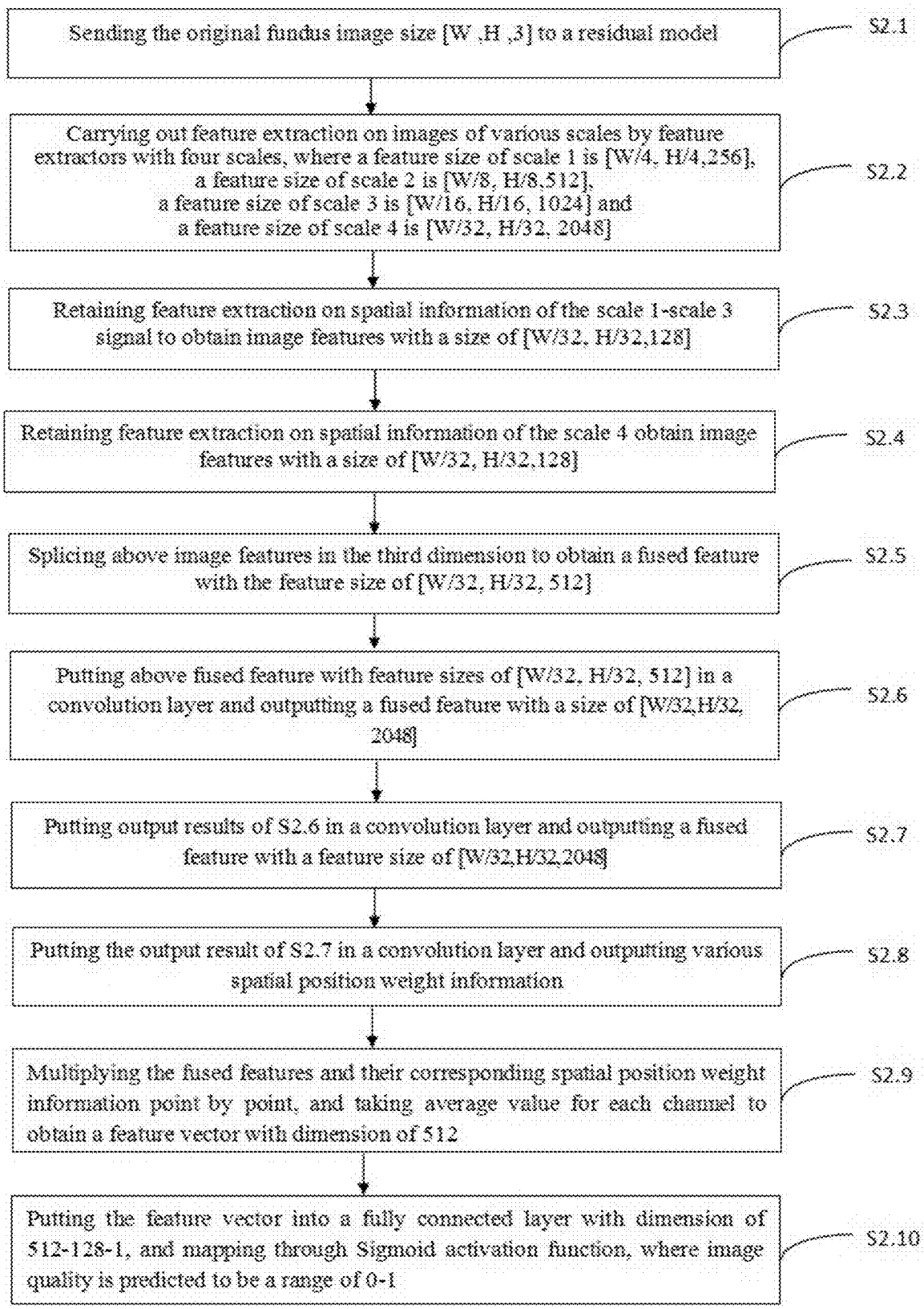
FIG. 4 is a schematic diagram of feature extraction of image scales in the present invention.

Based on the fundus image quality evaluation network constructed by the above 4 modules, specific steps of fundus image quality evaluation are as follows:

S2.1: sending the original fundus image size [W, H, 3] to a residual model for feature extraction of four scales, as shown in FIG. 4:

where a feature size of scale 1 is [W/4, H/4,256];
a feature size of scale 2 is [W/8, H/8,512];
a feature size of scale 3 is [W/16, H/16, 1024];
a feature size of scale 4 is [W/32, H/32, 2048];

S2.2: carrying out feature extraction on images of various scales by feature extractors with four scales;

S2.3: retaining feature extraction on spatial information of the scale 1 signal, dividing it into 64 feature blocks of [W/32, H/32, 256] in a spatial domain without overlapping, and splicing the 64 feature blocks in a third dimension in turn to obtain an image feature with a size of [W/32, H/32, 256*64], carrying out channel information fusion on obtained features by using 64 groups of convolutions, and finally obtaining an image features with a size of [W/32, H/32,128], where the convolution kernel size of this convolution layer is 1, the step size is 1, the number of input channels is 256*64, and the number of output feature channels is 128; in the convolution process, the output feature of channel 1-2 are only correlated with the input feature of channel 1-64, the output feature of channel 3-4 are only correlated with the output feature of channel 65-128, and so on;

retaining feature extraction on the spatial information of the scale 2 signal, and dividing it into 16 feature blocks of [W/32, H/32, 512] in the spatial domain without overlapping, and the 16 feature blocks are spliced in turn in the third dimension, and a feature with a size of [W/32, H/32, 52*16], performing channel information fusion on the obtained features by using 16 groups of convolutions, and finally obtaining an image feature with a size of [W/32, H/32,128], where the convolution kernel size of this convolution layer is 1, the step size is 1, the number of input channels is 512*16, the number of output feature channels is 128; in the convolution process, the output feature of channel 1-8 are only correlated with the input feature of channel 1-512, the output feature of channel 9-16 are only correlated with the output feature of channel 513-1024, and so on;

retaining feature extraction on the spatial information of the scale 3 signal, and dividing it into 4 feature blocks of [W/32, H/32, 1024] in the spatial domain without overlapping, and the 4 feature blocks are spliced in turn in the third dimension, and a feature with a size of [W/32, H/32, 1024*4], performing channel information fusion on the obtained features by using 4 groups of convolutions, and finally obtaining an image feature with a size of [W/32, H/32,128], where the convolution kernel size of this convolution layer is 1, the step size is 1, the number of input channels is 1024*4, the number of output feature channels is 128; in the convolution process, the output feature of channel 1-32 are only correlated with the input feature of channel 1-1024, the output feature of channel 33-64 are only correlated with the output feature of channel 1025-2048, and so on;

S2.4: retaining feature extraction on the spatial information of the scale 4 signal, and extracting the scale 4 signal with the size of [W/32, H/32, 2048] by using the 1×1 convolution layer to obtain a feature signal with the size of [W/32, H/32,128], where the convolution layer has 2048 input channels, 128 output channels;

S2.5: splicing the image features obtained in S2.3 and S2.4 in the third dimension to obtain a fused feature with spatial consistency and multi-scale information, where the feature size is [W/32, H/32, 512];

S2.6: putting above fused feature with feature sizes of [W/32, H/32, 512] in a convolution layer with the number of input channels of 512, the number of output channels of 2048, the size of convolution kernel of 3 and the step size of 1, and correlating output channels 1-4 only with input features of a channel 1, output channels 5-8 only with input features of a channel 2 by means of grouping convolution and in the same manner, outputting a fused feature with a size of [W/32,H/32,2048];

S2.7: putting output results of S2.6 in a convolution layer with 2048 input channels, 2048 output channels, convolution kernel size of 3 and step size of 1, correlating an output channel 1 only with the input features of the channel 1, an output channel 2 only with the input features of the channel 2 by means of grouping convolution and in the same manner, and outputting a fused feature with a feature size of [W/32, H/32,2048];

S2.8: putting the output result of S2.7 in a convolution layer with 2048 input channels, 512 output channels, convolution kernel size of 3 and step size of 1, controlling an output channel 1 to be correlated only with input features of channels 1-4, an output channel 2 only with input features of channels 5-8 by means of grouping convolution and in the same manner, and outputting various spatial position weight information;

S2.9: based on S2.5 and S2.8, multiplying the fused features and their corresponding spatial position weight information point by point, and taking average value for each channel to obtain a feature vector with dimension of 512;

S2.10: putting the feature vector obtained in S2.9 into a fully connected layer with dimension of 512-128-1, and mapping the results between 0 and 1 through Sigmoid activation function. The specific formula for predicting image quality is as follows:

$$q=g(f(X;\theta)\times att(f(X;\theta);\gamma);\delta),$$

where X is the input images and f(x; θ) is the multi-scale feature extractors, att(.; γ) is the attention module, g (.; δ) is the evaluation module.

As brightness evaluation results, blur evaluation results, contrast evaluation results and overall image quality evaluation results are binary values, so the image quality is good when output result q̂ is greater than or equal to the threshold value of 0.5, otherwise, the image quality is poor.

S3: training the fundus image quality evaluation network by using the training samples, and getting the fundus image quality evaluation model after the training.

During training, aiming at each evaluation dimension, the cross entropy of labeling labels and evaluation results is taken as a loss function of single evaluation dimension, and parameters of the fundus image quality evaluation network are updated by comprehensively considering the loss functions of four evaluation dimensions. Among them, Adam is selected as the optimizer, an initial learning rate is set to 0.001, and a weight decay coefficient is 0.0005.

S4: inputting the fundus images to be measured into the fundus image quality evaluation model, and outputting quality evaluation results through calculation.

According to the fundus image quality evaluation model of this embodiment, a fundus image quality evaluation device is also provided and the fundus image quality evaluation device includes a computer memory, a computer processor and a computer program stored in the computer memory and executable on the computer processor. When the computer processor executes the computer program, the following steps are implemented: fundus images to be detected are input into the fundus image quality evaluation model, and evaluation results of fundus image quality are output through calculation.

In the test, this method uses multi-source fundus data sets, including 756 common fundus photographs taken by the ordinary camera, 202 fundus photographs taken by the portable fundus camera, and 500 ultra-widefield fundus photographs taken by the ultra-widefield camera. The accuracy of the evaluation results in the three dimensions of brightness, blur and contrast is more than 92%, and the AUC is greater than 0.95, which provides great help for the preparatory work of artificial intelligence-assisted diagnosis, and has the potential of clinical application and popularization.

In accordance with one aspect of the disclosure, a fundus image quality evaluation method is provided, which is based on multi-source and multi-scale feature fusion, the method comprising:

S1: acquiring multi-source fundus images comprising common color fundus photographs taken by a common camera, fundus photographs taken by a portable fundus camera and ultra-widefield fundus photographs taken by an ultra-widefield camera, and labeling the multi-source fundus images with four evaluation dimensions of brightness, blur, contrast and overall image quality to obtain labels, and forming training samples with the fundus images and the labels;

S2: constructing a fundus image quality evaluation network comprising a feature extraction module, a fusion module, an attention module and an evaluation module, wherein the feature extraction module comprises multi-scale feature extractors for extracting multi-scale image features of fundus images, the fusion module is used for fusing the multi-scale image features to obtain fused features, the attention module is used for performing attention operation on input fused features, and inputting the dot product of attention operation results and input fused features to the evaluation module, and the evaluation module is used for predicting and performing calculation on the dot product to output quality evaluation results, wherein the quality evaluation results comprise brightness evaluation results, blur evaluation results, contrast evaluation results and overall image quality evaluation results;

S3: training the fundus image quality evaluation network by using the training samples, and obtaining a fundus image quality evaluation model after training; and S4: inputting fundus images to be measured into the fundus image quality evaluation model, and outputting the quality evaluation results through calculation

What is claimed is:

1. A fundus image quality evaluation method based on multi-source and multi-scale feature fusion, comprising:
   S1: acquiring multi-source fundus images comprising common color fundus photographs taken by a common camera, fundus photographs taken by a portable fundus camera and ultra-widefield fundus photographs taken by an ultra-widefield camera, and labeling the multi-source fundus images with four evaluation dimensions of brightness, blur, contrast and overall image quality to obtain labels, and forming training samples with the fundus images and the labels;
   S2: constructing a fundus image quality evaluation network comprising a feature extraction module, a fusion module, an attention module and an evaluation module, wherein the feature extraction module comprises multi-scale feature extractors for extracting multi-scale image features of fundus images, the fusion module is used for fusing the multi-scale image features to obtain fused features, the attention module is used for performing attention operation on input fused features, and inputting the dot product of attention operation results and input fused features to the evaluation module, and the evaluation module is used for predicting and performing calculation on the dot product to output quality evaluation results, wherein the quality evaluation results comprise brightness evaluation results, blur evaluation results, contrast evaluation results and overall image quality evaluation results;
   S3: training the fundus image quality evaluation network by using the training samples, and obtaining a fundus image quality evaluation model after training; and
   S4: inputting fundus images to be measured into the fundus image quality evaluation model, and outputting the quality evaluation results through calculation.

2. The fundus image quality evaluation method based on multi-source and multi-scale feature fusion according to claim 1, wherein before the fundus images are input into the fundus image quality evaluation network, the fundus images are preprocessed, comprising cropping, scaling and obtaining a mask of eyes, and preprocessed fundus images are input into the fundus image quality evaluation network.

3. The fundus image quality evaluation method based on multi-source and multi-scale feature fusion according to claim 1, wherein the feature extraction module includes feature extractors with four scales, and sizes of correspondingly input fundus images are ¼, ⅛, 1/16, and 1/32 of an original image resolution, respectively; each feature extractor performs a convolution operation on the input fundus images to obtain image features, and dimensions and sizes of the image features output by the feature extractors are the same as each other.

4. The fundus image quality evaluation method based on multi-source and multi-scale feature fusion according to claim 3, wherein the image features output by each feature extractor are spliced and then input to the fusion module, the fusion module performs a convolution operation on spliced image features by adopting convolution layers, and the fused features are obtained.

5. The fundus image quality evaluation method based on multi-source and multi-scale feature fusion according to claim 1, wherein the evaluation module is an Multi-Layer Perceptron (MLP) classifier, and the MLP classifier is adopted to predict and perform calculation on the input fused features to output quality evaluation results.

6. The fundus image quality evaluation method based on multi-source and multi-scale feature fusion according to claim 1, wherein during training, for each evaluation dimension, a cross entropy of labeling labels and evaluation results is taken as a loss function of single evaluation dimension, and parameters of the fundus image quality evaluation network are updated by comprehensively considering loss functions of four evaluation dimensions.

7. The fundus image quality evaluation method based on multi-source and multi-scale feature fusion according to claim 1, wherein during training, Adaptive Moment Estimation (Adam) is selected as an optimizer, and an initial learning rate is set to 0.001, and every 20 epochs are decayed by 0.0005 times.

8. A fundus image quality evaluation device, comprising: a computer memory, a computer processor and a computer program stored in the computer memory and executable by the computer processor, wherein when the computer program is executed by the computer processor, the device is caused to perform the steps of any of the methods of claims 1-7.

* * * * *